April 20, 1943. J. L. LABOULAIS 2,316,875
PULVERIZING MILL CONTROL SYSTEM
Filed Oct. 5, 1940 5 Sheets-Sheet 2
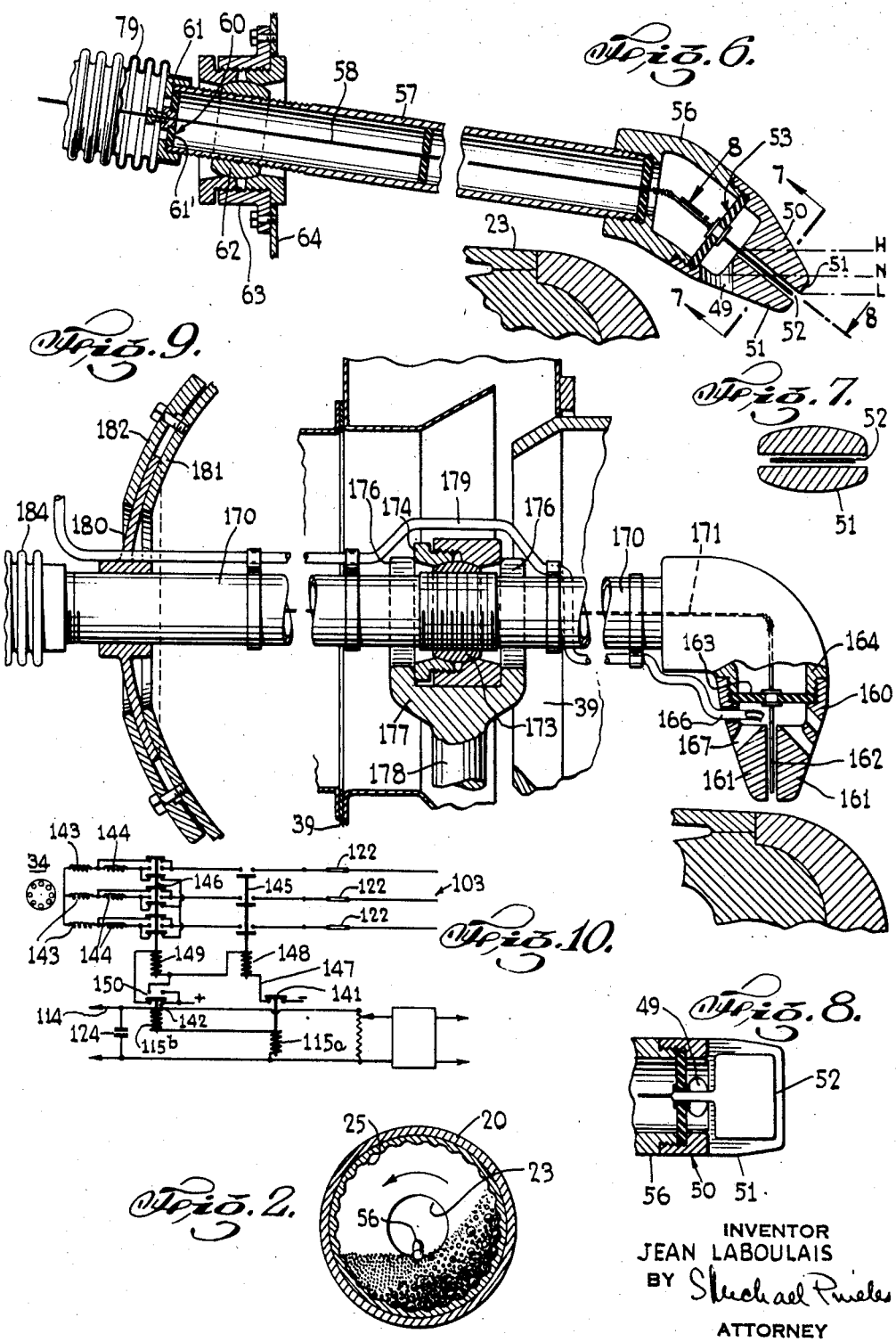
INVENTOR
JEAN LABOULAIS
BY
ATTORNEY

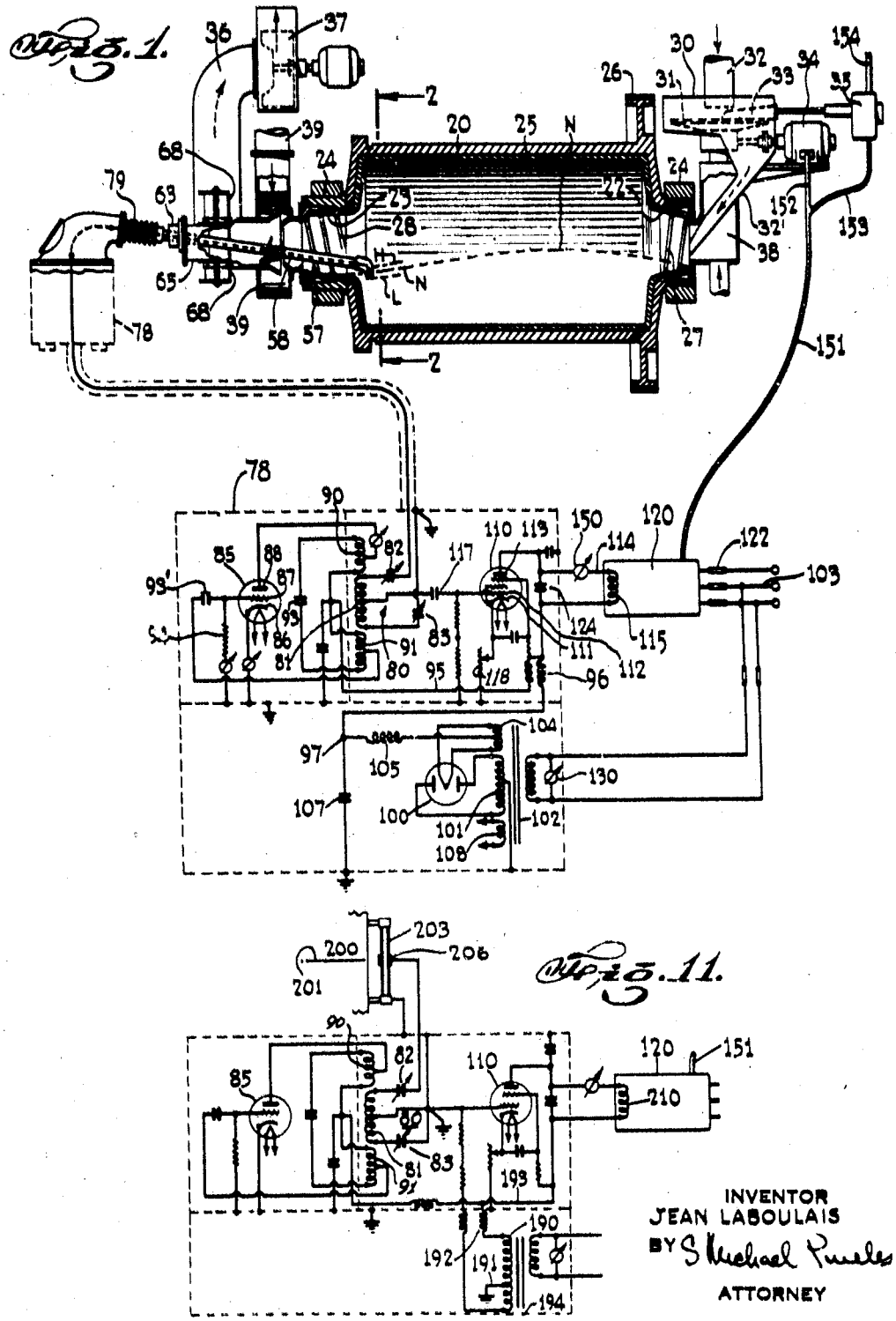

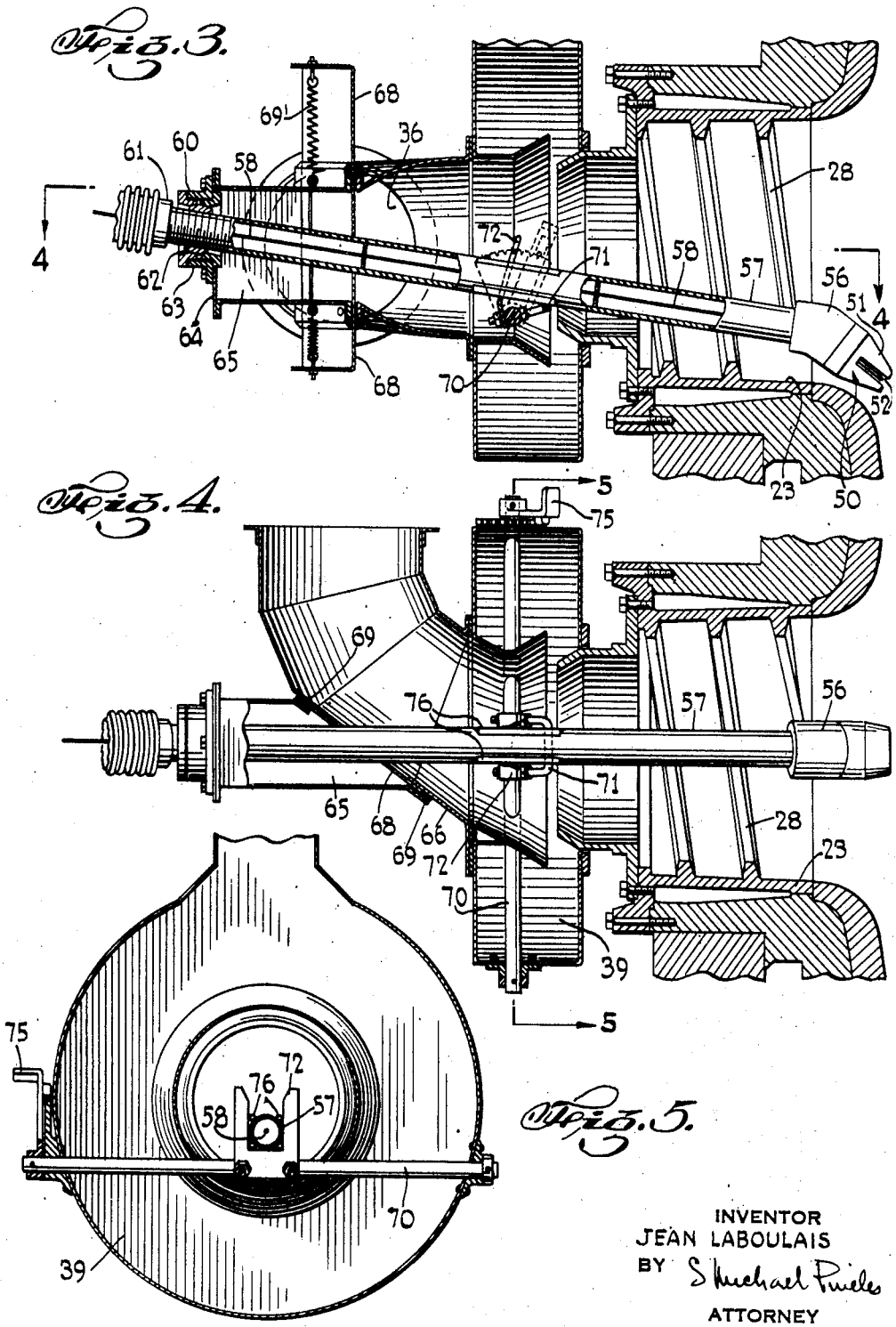

April 20, 1943.    J. L. LABOULAIS    2,316,875
PULVERIZING MILL CONTROL SYSTEM
Filed Oct. 5, 1940    5 Sheets-Sheet 4
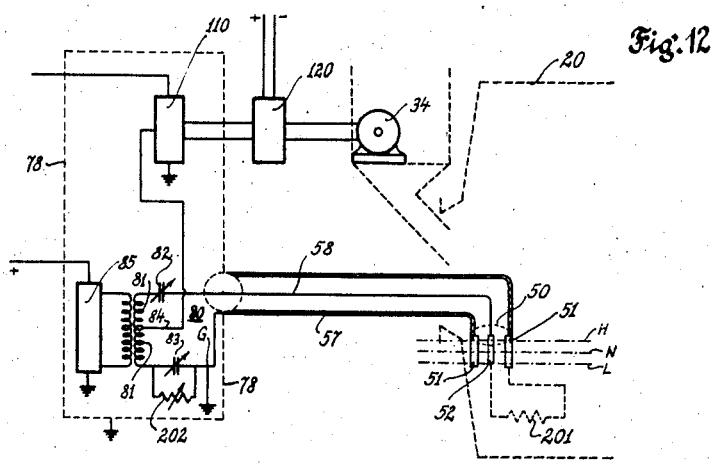
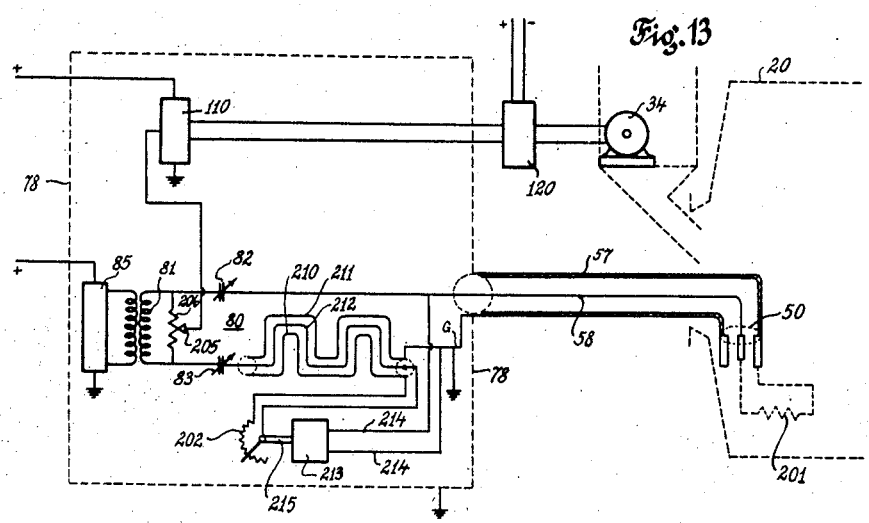
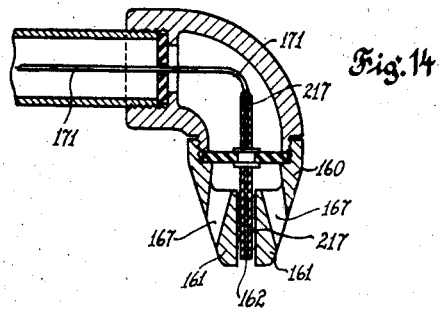
INVENTOR
Jean L. Laboulais
BY
S. Michael Pineles
ATTORNEY April 20, 1943.  J. L. LABOULAIS  2,316,875
PULVERIZING MILL CONTROL SYSTEM
Filed Oct. 5, 1940   5 Sheets-Sheet 5

INVENTOR
Jean L. Laboulais
BY S Michael Priele
ATTORNEY

Patented Apr. 20, 1943

2,316,875

UNITED STATES PATENT OFFICE 2,316,875

PULVERIZING MILL CONTROL SYSTEM

Jean L. Laboulais, New York, N. Y., assignor to Kennedy-Van Saun Mfg. & Eng. Corporation, a corporation of Delaware Application October 5, 1940, Serial No. 359,953

24 Claims. (Cl. 83—9)

This application is a continuation-in-part of my application Serial No. 202,835, filed April 19, 1938.

This invention relates to control systems for pulverizers, such as air swept impact pulverizing mills and operating mechanisms or structures involving problems similar to those encountered in such mills.

Among the objects of the invention is a control system for an operating structure requiring a predetermined character of regulation in which a control unit which is located in a position in which it is subjected to the operating conditions of said structure is included in a control circuit which is associated with oscillator means producing in the control circuit oscillatory currents which respond in a predetermined manner to the variations of the operating conditions to which the control unit is subjected for controlling in a predetermined manner the operation of said structure.

One of the particular objects of the invention is an improved electric control system for pulverizers utilizing as a control element a small control condenser unit which is connected in a control circuit and so arranged and proportioned that a relatively small change in the inductive capacity in the control condenser unit produced by variations of the level of the pulverized material or similar critical operating condition will be sufficient to effect reliable control of the operation of the pulverizer so as to maintain its efficient operation under all load conditions.

The foregoing and other objects of the invention will be best understood from the following description of exemplifications thereof, reference being had to the accompanying drawings, wherein Fig. 1 is a diagrammatic view of a level control system for a coal pulverizing mill exemplifying the invention;

Fig. 2 is a cross sectional view along line 2—2 of Fig. 1 illustrative of an instantaneous operating condition in the interior of the revolving shell of such mill;

Fig. 3 is a cross sectional view of the control condenser unit support;

Fig. 4 is a horizontal cross sectional view along line 4—4 of Fig. 3;

Fig. 5 is a vertical cross sectional view along line 5—5 of Fig. 4;

Fig. 6 is an enlarged vertical sectional view of the control condenser structure and the mounting of its supporting arm shown in Fig. 3;

Fig. 7 is a cross sectional view of the condenser unit along line 7—7 of Fig. 6;

Fig. 8 is a cross sectional view through the condenser unit along line 8—8 of Fig. 6;

Fig. 9 is a cross sectional view similar to Fig. 6 illustrating another modified level condenser arrangement;

Fig. 10 illustrates a motor control system exemplifying one form of motor control utilized in conjunction with the control system described in connection with Fig. 1;

Fig. 11 is a diagram illustrating another exemplification of the invention;

Fig. 12 is a diagrammatic view of a level control system of the type shown in Figs. 1 to 4 and embodying certain modifications;

Fig. 13 is a view similar to Fig. 12 illustrating another level control arrangement exemplifying the invention;

Fig. 14 is a view similar to Fig. 9 illustrating another form of level control condenser;

Figure 15:
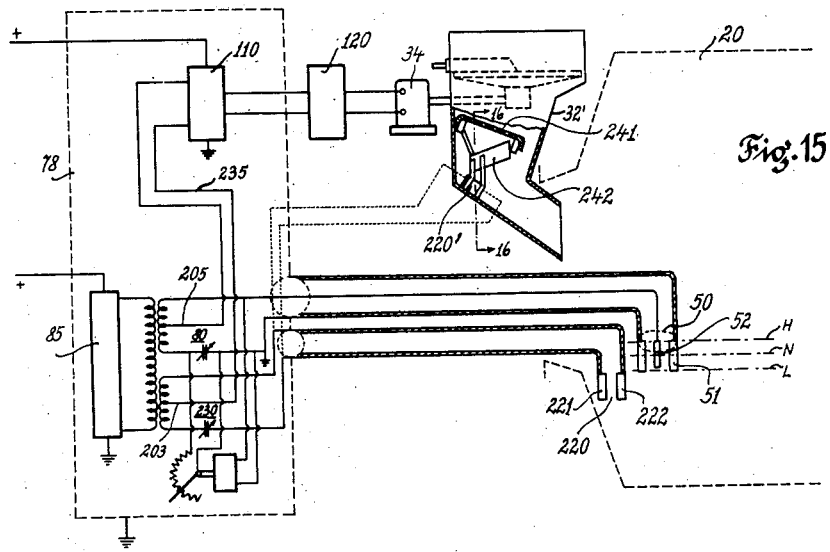
Fig. 15 is a view similar to Fig 12 showing a further control arrangement of the invention.

An exemplification of the invention as applied to a typical coal pulverizing mill used for supplying pulverized coal to the boilers of large power plants and similar applications is shown diagrammatically in Fig. 1. The mill comprises a rotatably mounted tubular shell 20 to which are secured two heads having trunnions 22, 23 journalled in bearings 24 on which the shell is rotated. The interior walls of the shell are suitably covered by wear resisting liners 25. The shell is rotated by a motor drive, such as an electric motor, not shown, through suitable gearing indicated by the gear 26 mounted on the shell 20.

The material, such as coal, that is to be ground is fed into the shell 20 at a suitable rate by a feeding mechanism, such as a disc feeder 30 having a rotating feed disc 31 to which the material is supplied from a spout 32. An adjustably mounted plow 33 removes the material from the disc into a feed chute 32' which in turn discharges the material through the inlet trunnion 22 into the mill shell 20 at a rate determined by the speed of the disc 31 and the position of the plow 33. The feed disc is driven by a suitable electric motor 34 and the position of the plow is varied by a suitable control device 35, so that by controlling the operation of the disc drive (motor 34) or the plow control device 35, the rate at which the material is fed to the mill may be readily controlled.

The pulverized material leaves the shell 20 through the discharge trunnion 23 into a discharge duct 36 into which the pulverized material is swept by a stream of air produced by a motor driven suction fan 37.

In pulverizing coal, the air which is swept through the mill shell is usually preheated and serves as combustion air. As shown in Fig. 1, a part of the preheated air may be supplied at the inlet trunnion 22 through an air inlet chamber 38 and a part of the preheated air may be supplied at the outlet trunnion 23 as by means of an air inlet chamber provided at the junction between the outlet trunnion 23 and the discharge duct 36.

Mills of the type described above are used for pulverizing and reducing coal, carborundum, quartz, silica, rock, limestone and similar materials. The pulverizing action is effected by rotating the shell 20 into which has been placed a charge of relatively heavy impact members, usually a quantity of steel balls of different sizes, while feeding the material that is to be pulverized into the shell. The shell 20 is rotated at a speed which causes the balls to be carried around and lifted to a level from which they are thrown down on the material in the way indicated in Fig. 2, producing a cascade of whirling balls which break up and pulverize the material while the stream of air sweeps the pulverized powder out of the mill into the discharge duct 36.

When coal pieces, or similar material that is to be pulverized, enter the mill through the inlet trunnion 22, they are more or less picked up with the impact balls by the revolving shell and, under the action of a stream of air flowing through the shell, the powdered coal produced by the impacts of the balls is carried forward towards the outlet trunnion 23. In order to keep the coarse material in the shell 20, the screw helix 27 in the inlet trunnion 22 is arranged to assist in feeding the coarse coal into the enclosure 25, and the oppositely acting screw helix 28 in the outlet trunnion returns coarse coal particles admixed with the pulverized material reaching the outlet trunnion to the shell.

Under normal operating conditions required for efficient pulverizing action, the contents of the revolving shell will assume an average level indicated by line N, the level at the inlet end where the coarse material preponderates being higher than at the outlet end where the fine pulverized material on its way to the discharge duct 36 settles and forms with the entrapped air a mass of powder which floats above the level of the impact balls.

It was long known that in order to secure efficient pulverizing action and a uniform finely pulverized product, the operation of such mills must be carefully regulated so as to maintain the level of the pulverized material accumulating in the shell within close limits. Such efficient mill operation is of particular importance in coal pulverizing mills used in the boiler plants of large electric power plants. To assure continuity of service under varying load conditions, the coal pulverizers must be able to feed to the combustion space of the boilers a continuous supply of extremely fine pulverized fuel coal of a high degree of uniformity at a varying rate in accordance with the varying load conditions.

Only by maintaining the level of the pulverized material in the revolving shell within close limits is it possible to supply to the boiler pulverized coal of a uniform grade of fineness notwithstanding variations of the load. Maintenance of a close level makes also possible full utilization of the pulverizing capacity of such mill. Furthermore, it prevents excessive wear and reduces the maintenance work with the incident service interruptions because the balls are prevented from hitting one against the other, or against the walls of the shell lining.

Various types of level controls for such pulverizing mills have been developed in the past in an effort to maintain the conditions required for satisfactory operation. One type of control attempted to utilize the change of the noise level produced by the whirling contents of the rotating shell under varying operating conditions for stopping and starting the operation of the feeding mechanism. Such control system is unsatisfactory because variations in the noise level is not a reliable indication of the variations of the level of the pulverized material in the mill.

Another type of control attempted to utilize the variations of the suction effect of the air flowing through the mill for controlling the operation of the mill. This control is also inherently unreliable. The powder clouds which fill the rotating shell enter all suction ducts which lead into the shell, and powder is deposited in the suction tubes, clogging the control apparatus and upsetting its operations. The variations of the air pressure in the shell under varying load conditions likewise interfere with the satisfactory operation of such suction control systems.

Among other factors which render such prior control systems unreliable are the erratic impact actions of the whirling mixture of the pulverized material and balls, the dust cloud formations in the shell, the varying moisture content of the material and the irregularities in the level of the material resulting from the rolling motion of the mill contents.

The invention overcomes these difficulties and secures an effective reliable control of the critical operating conditions of such mills by an electric mill regulating and control arrangement which makes possible the utilization of the variations of the level of the powdered material formed in the rotating shell for controlling an electric current which regulates the operation of the mill so as to maintain throughout the operation the conditions at which the pulverizing action of the mill is most effective.

In accordance with the invention, the electric control circuit for regulating the operation of the mill is so arranged and designed as to enable the utilization of the variations of the level of the pulverized material in the rotating shell for effecting the control action which maintains the favorable operating conditions of the mill without being materially affected by the irregularities inherent in the operation of such mills.

In the practical embodiment of the invention described hereinafter, the control circuit which regulates the operation of the mill utilizes as a control element a small lever control condenser unit which is mounted inside the revolving shell and is exposed to impacts of the flying balls. The condenser consists of an outer rigid condenser member having an effective condenser area facing the effective area of an inner condenser member of opposite polarity. The outer condenser member serves as an armor and guard for the inner condenser member and the condenser space between the opposite condenser areas, and the several level control condenser elements are constructed and arranged to prevent the whirling material and particles in the revolving shell from affecting the capacitive relation between the condenser members of opposite polarity and disturbing its regulating action.

The elements of the control condenser unit are so arranged, designed and located that the pulverized powdered material produced in the shell under the action of the impact members enters into the space between the condenser areas to a more or less extent in accordance with the variations of the level of the material in the shell so as to vary the effective inductive capacity between the condenser members of opposite polarity in accordance with the variations of the level of the material.

The effect of the variations of the moisture and the leakage resistance of the powdered material and the dust laden atmosphere on the action of the level control condenser unit is rendered negligible by operating the control circuit with a current which undergoes substantial variations in response to the variations of the quantity of the powdered material entering between the effective areas of the control condenser, but is of substantially negligible sensitivity to the variations in the dust cloud formations within the shell and the moisture content of the material.

In addition, the control arrangement is so designed as to compensate for the inherent irregularities in the level of the material in the revolving shell caused by the rolling motion of the material. The control circuit is arranged to be traversed by oscillatory currents of a relatively high frequency which is so chosen in its relation to the other elements of the control circuit and the control arrangement that a relatively small change in the amount of the pulverized material entering the effect gap spaces of the control condenser results in a substantial change in the capacitive reactance across the control condenser.

In the practical embodiments of the invention, the circuits associated with the level control condenser and the various cooperating elements of the control arrangement are designed and correlated to produce in the circuit including the relatively small control condenser unit exposed in the interior of the revolving shell an oscillatory current at which a relatively small change in the level of the pulverized material entering the effective gap spaces of the control condenser will produce a variation of the current flowing through the condenser which is sufficient for effecting a reliable control of the operation of the mill so as to maintain the effective control of the pulverized material within a predetermined desired range essential for efficient pulverizing action. In addition, the several elements of the control system are so arranged and correlated as to render the resulting effective control action practically independent from the irregularities in the level of the material resulting from erratic action of the whirling contents of the revolving shell.

In the exemplification of the invention described in connection with Figs. 1 to 4, this is secured by producing in the control circuit including the level control condenser, which because of the small capacity of the control condenser unit is resonant for oscillatory currents of a radio frequency of the order of 1,000 kilocycles ($10^6$ cycles), a control current of a frequency of the order of 100 kilocycles. With such arrangement, small variations of the inductive capacity of the small level control condenser caused by variations of the level of the pulverized material entering between the plates of the control condenser will produce substantial variations of the magnitude of the oscillatory currents flowing in the control circuit connected in series with the level control condenser. By using oscillatory currents of a frequency substantially lower than the resonance frequency of the control circuit through the level control condenser exposed to the contents in the interior of the revolving shell, the ratio of the reactive impedance of the control condenser to the reactive impedance of the part of the control circuit connected in series with the control condenser is made relatively large notwithstanding the shunt capacity between the leads of opposite polarity extending from the plates of the control condenser in the interior of the revolving shell and the parts of the control circuit which are located outside the shell. As a result, the magnitude of the oscillatory current in the control circuit will be sensitive to variations of the inductive capacity between the relatively small condenser plates, and small variations in the level of the pulverized material entering the space between the condenser elements are able to exert the regulating effect required for maintaining a close control of the level of the pulverized material within the revolving shell. This arrangement also renders the level regulating action of the control condenser immune to the variations of the moisture content of the pulverized material and the dust clouds in the interior of the revolving shell because at the relatively high frequency of the oscillating currents in the control circuit including the control condenser, the effect of the leakage current is negligible and the variations of the inductive capacity across the space between the condenser plates produced by the variations of the level of the pulverized material exert the controlling effect on the current through the control condenser.

In the exemplification of the invention shown in Figs. 1 to 4, the level control condenser consists of an outer condenser member 50 formed of a strong rigid hollow housing section having two downwardly extending rigid condenser plate projections 51 between which is mounted the inner plate shaped condenser member 52 of opposite polarity. The inner condenser plate member 52 is held in place by a suitable insulating support 53 clamped between the flanged housing section of the outer condenser member 50 and the interfitting section of the adjoining elbow member 56. The edges of the outer condenser plates 51 extend beyond the edges of the inner condenser plate 52 so as to prevent the impact balls tossed inside the mill shell from coming into contact with the inner condenser plate 52. The outer guard walls of the condenser member are preferably covered with a layer of wear resistant material, such as manganese, so as to resist the shocks and wear under the impacts of the flying material. Clogging of the inner space between the condenser plates is prevented by providing in the outer condenser member 50 one or more outlet passages 49 so that as a result of the impacts of the flying balls and the shaking action to which the condenser is subjected, material entering the inner condenser space will drop out as the level of the material recedes below the openings.

The lower edges of the control condenser plates 51, 52 are held in a position adjacent the outlet trunnion 23 of the shell 20 by a tubular condenser arm 57 which has a threaded inner end portion engaging a threaded portion of the condenser elbow junction 56. The conducting condenser arm 57 serves as a grounded conducting shielding lead to the outer condenser plates 51, and an inward extension of the inner condenser plate 52 is connected to an insulated shielded connector lead 58 extending to a terminal member mounted on an insulating plate 60 suitably clamped to the outer end of the condenser arm, as by a clamping ring 61.

The condenser arm is suitably mounted so as to permit ready adjustment of the position of the edges of the condenser plates 51, 52 in relation to the level of the pulverized material in the rotating shell.

One form of such adjustable support is shown in Figs. 3 and 4. The rear end of the condenser arm 57 is shown provided with an adjustable swivel member 62 which is journalled in a bearing socket 63 mounted on the outer wall 64 of a housing projection 65 extending from the elbow 66 of the suction duct 36. A shaft 70, which is journalled in the opposite side walls of the suction inlet chamber, has mounted thereon a lifter member 71 formed of a U-shaped solid rod having threaded connections with the shaft 70 which clamp to the shaft a forked plate 72, the lifter member 71 and the forked plate 72 serving as an intermediate support and guide for the condenser arm 57. Turning the lifter shaft 70, as by the handle 75, brings the lifter member 71 into engagement with the underside of the condenser arm and enables lifting and lowering of the condenser arm, and thus permits ready adjustment of the level of the control condenser plates 51, 52 in the shell. The condenser support may also be arranged to permit lateral adjustment of the position of the condenser plates 51, 52, for instance, through longitudinal shifting of the lifter shaft 70. As shown in Fig. 4, the portion of the condenser arm which is engaged by the lifter member 71 and the guide fork 72 may be provided with longitudinal ridges to prevent turning of the arm 57.

In order to prevent dust clouds drawn by the suction from the shell into the discharge duct 36 from clogging up the tubular housing extension 65 which carries the swivel support of the condenser arm 57, the housing extension is normally closed by a gate having two gate halves 68 slidably mounted in a guide slot 69 provided at the junction between the chamber extension 65 and the discharge duct elbow 66, the two gate halves being normally biased to a closed position by a spring mechanism 69'. This arrangement permits quick removal or replacement of the control condenser unit mounted in the revolving shell for repair or readjustment to different operating conditions without upsetting the continuity of the mill operation.

The control condenser plates 51, 52 form a part of an electric control circuit arrangement having its component elements housed in a metallic casing 78 which is mounted on a suitable vibration absorbing support outside the shell. An electrically conductive bellows-like enclosure 79 extending from the clamping ring 61 mounted on the outer end of the tubular condenser arm 57 to the circuit casing 78 serves as a guard and an electric shield for the extension of the insulated lead 58 extending from the inner insulated condenser plate 52 and the control regulating circuit housed in the shielded casing 78.

In the form shown in connection with Fig. 1, the electric regulating circuit arrangement comprises a high frequency control circuit 80 which includes, in addition to the condenser formed of the plates 51 and 52 of the control condenser, serially connected inductive windings 81 and one or more auxiliary condensers 82, 83. This control circuit is suitably coupled with a high frequency oscillation source comprising an electron discharge valve 85 having a cathode 86, a control grid 87 and an anode 88 which are associated with an oscillatory circuit formed of the windings 90, 91 and a condenser 93 which are arranged and connected to oscillate at the desired frequency. Any suitable electrical connections for generating the oscillations may be used.

As shown, the grid 87 of the oscillator valve 85 is connected through a grid-leak condenser 93' to a tap on the windings 90, 91 and through a grid-leak resistance 94 to the grounded side of the circuit indicated by the casing 78 which acts also as a shield for the high frequency circuits. The anode circuit is connected through lead 95 including a high frequency choke coil 96 to the positive terminal 97 of a direct current source. The direct current source is shown in the form of a rectifier 100 having the anodes supplied by the secondary transformer winding 101 of a transformer 102 which is energized from an alternating current source 103, the cathode of the rectifier being connected to another secondary transformer winding 104 of the transformer which energizes the cathode and leads it through a filter choke coil 105 to the positive supply terminal 97 connected across a filter condenser 107 and the grounded side of the supply circuit to which the anode supply transformer winding 101 is connected. As shown, an additional secondary transformer winding 108 serves to supply heating current to the cathode heaters of the electron discharge valves. The frequency of the generated oscillations is fixed by the suitable choice of the elements of the oscillator arrangement and, if desired, the frequency may be maintained within a close fixed range by a standard crystal oscillator or similar device.

As shown in Fig. 1, the windings 80 of the bridge circuit are coupled with the windings 90, 91 of the oscillator circuit and as a result the high frequency output of the oscillator circuit will be supplied to the bridge circuit including the windings 80 and the control condensers 82, 83.

The control circuit is associated with a suitable detector circuit arranged to respond to variations of the high frequency current flowing through the control condenser 50. In the arrangement shown in Fig. 1, a combined detector and amplifier electron discharge valve 110 is used consisting of a cathode 111, a control grid 112 and an anode 113 which are associated with a suitable input and output circuit for rectifying the high frequency input impressed between the grid 112 and the cathode 111 and delivering the amplified rectified input to the output circuit including an actuating winding 115 leading from the anode 113 to the positive terminal 97 of the direct current supply source.

The high frequency input is impressed upon the grid 112 of the detector tube 110 by way of a coupling condenser 117 through a lead connected to a tap on the windings 80 of the control condenser circuit. The grid 112 of the detector tube is also connected through suitable grid-leak resistors to the grounded side of the circuit to which the cathode 111 is connected through an adjustable tap bias resistor 118.

A relatively large capacity condenser 124 connected in parallel to the output windings 115 is so proportioned and correlated to the other elements of the output circuit as to render the control current supplied to the output windings insensitive to the minor fluctuations in the level of the material in the mill caused by the irregularities inherent in the operation of the revolving shell and the material picked up by the revolving shell. To prevent disturbances by fluctuations of the supply voltage, a suitable protective device, such as a glow tube 130, is connected across the leads to the supply transformer 102.

In the arrangement shown in Fig. 1, the control condenser 50 with the windings 80 and the condensers 82, 83 form a bridge circuit. The input leads to the detector are connected across the bridge circuit to a point in the high frequency input windings 80 and the grounded lead to the control condenser 50, so that any high frequency impulses impressed by the control circuit on the detector circuit will be rectified and supplied as an amplified rectified current to the output winding 115 of the detector circuit.

By adjusting the various elements of the control circuit and the detector input and output circuit, and suitable adjustment of the potentials applied to the various elements of the detector circuit, the rectified output current supplied to the output winding 115 of the detector circuit is utilized as an accurate and sensitive indication and measure of slight variations of the capacitive reactance formed between the plates 51 and 52 of the level control condenser, while rendering negligible the effect of the minor irregularities in the level of the material inherent in the operation of the revolving shell. By shielding the lead from the insulated level condenser plate throughout its length and placing the elements of the oscillator and detector circuits in separate grounded shielded compartments as indicated in Fig. 1, spurious disturbances of the indications and measurements secured by this arrangement are eliminated.

In the actual operation of the arrangement described above for controlling the operation of a coal pulverizing mill, the various elements are adjusted as follows:

The control condenser 50 is so adjusted that the lower edge of the inner condenser plate 52 is at a height corresponding to the minimum level below which the pulverized material in the shell should not fall. The bridge circuit including the level condenser plates 51, 52 and the detector circuit are then so adjusted that with the level condenser plates 51, 52 in the adjusted minimum level position, the output in the output circuit to the winding 115 of the detector is at a minimum. With the adjustment so fixed, a rise in the level of the pulverized material will cause a part of the powdered material to enter the space between the level condenser plates 51, 52 and change the effective inductive capacity in the space between the electrode plates 51, 52 of opposite polarity.

As described above, the frequency of the oscillating current in the bridge circuit is made sufficiently high so as to render the effect of leakage negligible while assuring that even a small change in the effective inductance capacity between the facing condenser elements 51, 52 of the level control condenser 50 shall impress a substantial control potential across the input electrodes of the detector arrangement which in turn produces in the circuit through the output coil 115 of the detector arrangement a change in the current which is sufficient for controlling a standard relay and control arrangement indicated schematically in Fig. 1 at 120 for controlling the operation of the mill, for instance, by controlling the speed of the driving motor 34 of the feed disc or the disc feed plow control device 35, and, as shown, the control arrangement may be suitably connected, as through switches 122, to the source of alternating current supply 103.

In actual operation, the high frequency mill level control arrangement described above was found sufficient to produce in response to small changes in the average level of the pulverized material in the rotating shell, of the order of one-quarter of an inch, changes in the current through the output coil 115 of the detector circuit that are sufficient for actuating standard available relays and are suitable for controlling through such relays, or in conjunction with an electronic control circuit, any standard motor control arrangement for controlling the speed of the material feed disc 31 or feed plow 33, or both, so as to increase or decrease the rate at which the material is fed to the shell and to maintain the level of the ground material continuously at a desired avarage value.

In a practical embodiment of the invention made as described in connection with Figs. 1 to 4, the arrangement which proved practically successful and controlled the operation of the mill within very close limits required for efficient operation was made according to the designs set forth below.

The level control condenser consisted of an inner plate having an area 4 inches wide, 1¼ inches high and $\tfrac{1}{16}$ of an inch thickness mounted between two outer condenser plates 51 spaced by a gap of $\tfrac{3}{16}$ of an inch. The outer condenser plate 51 on the top of the condenser unit had a width of 5 inches and the bottom condenser plate 51 had a width of 4¾ inches. The level control arm which supports the level control condenser in the rotating shell and forms the conducting grounded lead to the outer condenser plates 51 as well as the shielded enclosure for the inner conducting lead to the inner condenser plate 52 was made of a 2-inch steel pipe and had a length of 3¾ feet.

The oscillating circuit was designed to supply the bridge circuit with an oscillating current having a frequency of about 100,000 cycles, but in actual tests this frequency was not critical. After adjustment of the bridge circuit and the detector circuit so as to impress on the detector input electrodes a minimum voltage while the inner level control condenser plate 52 did not quite reach the level of the ground material in the mill shell, the minimum output current supply to the output coil 115 was less than .2 milliampere, and the output current increased from about .2 milliampere to 3.5 milliamperes as the space between the level control condenser plates was filled with the coal powder through the rise of the level of the powdered material formed in the mill when the coal was fed at an excessive rate. A meter 150 may be provided in the output circuit to coil 115 to facilitate the adjustment of the output current.

By utilizing a circuit arrangement which impresses on the detector input circuit voltages varying from a minimum value to a multiple thereof in the way described above, changes of the order of ¼ to 1 inch in the level of the pulverized material at the outlet region of the pulverizing mill will produce in the output circuit of the detector substantial currents varying over a range from 1 to 6 times the minimum value of the output current. Such current variations in the output circuit are more than sufficient for actuating commercially available relays or for operating any of the known motor control arrangements so as to control the operation of the mill to maintain the level of the pulverized material in the outlet region of the mill within close limits of the order of ¼ to 1 inch required for efficient operation of such mills and the production of pulverized material of a uniformly high degree of fineness.

One form of such motor control circuit is shown in Fig. 10 in which the variations of the current in the output circuit 114 of the detector is utilized to control the operation of the motor 34 which drives the feed disc 31. The motor 34 is shown in the form of a three phase squirrel cage motor having two sets of three phase windings 143, 144 which are arranged to be connected through two sets of contactors 145, 146 to a three phase supply source 103 so as to operate the motor either at a high speed with one number of poles when both contactors 145, 146 are in the upper position, or at half speed with twice the number of poles if only the contactor 145 is in the upper position and the contactor 146 is in the lower position.

The control relays 141, 142 are shown energized by two sections of the output winding 115 of the detector output circuit 114, relay 141 being of lower sensitivity than relay 142. The relays 141, 142 control the actuating circuit 147 including the windings 148, 149 of the two contactors 145, 146 so that when the contacts of the two relays 141, 142 are in the downward position, the actuating coils 148, 149 of both contactor switches are energized and the motor 34 is connected to run with a small number of poles at the maximum speed. Such high speed motor operation takes place when the current through the output windings 115a and 115b is at a minimum during a low level operating condition of the mill which requires that the material should be fed to the mill at the maximum rate. As soon as sufficient material has been fed into the mill at the high rate of speed so as to raise the level of the pulverized material to a height corresponding, for instance, to a condition where approximately ⅓ of the space between the opposite level control condenser plates 51 and 52 is filled with the pulverized material, the change in the inductive capacity of the level control condenser is sufficient to increase the detector output current to a value at which the more sensitive relay 142 is actuated by its winding 115b to open its back contacts and close its front contacts 150, de-energizing the actuating coil 149 of the switch 146 and causing it to connect the disc feed motor to operate with twice the number of poles at half the speed.

Should the rate at which the material that is to be pulverized and fed to the mill while the motor is running at its normal lower speed with only the contactor 145 energized bring about excessive accumulation of the powdered material so as to fill more than about ⅔ of the space between the condenser plates, the resulting change in the inductive capacity between the condenser plates produces a further increase in the output current of the detector. As a result, the less sensitive relay 141 is actuated by the winding 115a to open its contacts and thus de-energize the actuating coil of contactor 145, thereby cutting off the motor supply and stopping the operation of the disc feed motor. After, in the course of the further operation, the level of the pulverized material in the shell again drops sufficiently so as to clear a part of the space between the level control condenser plates and bring about a reduction in the detector output current sufficient to de-energize the actuating winding 115a of the low sensitivity relay, the contactor 145 will again be actuated to connect the disc feed motor to operate it at the low speed and feed the material to the mill.

If, in the course of the further operation of the mill, the level of the material drops below the desirable normal level employing another portion of the space between the condenser plates 51, 52 sufficient to reduce the detector output current so as to bring about the closure of the back contacts of the highly sensitive relay 142, the contactor 146 will be actuated to reconnect the motor for high speed operation with half the number of poles and feed the pulverized material at a high speed until the level of the pulverized material in the outlet region of the mill shell has again reached its higher level condition, whereupon the output current again establishes the low speed operating position at which the motor runs at the lower speed in the way explained above.

In utilizing the motor control shown in connection with Fig. 10, the level control condenser and the various motor control relays are preferably so arranged and adjusted that during the main operating periods of the mill, the motor operates either at its double pole number lower speed or at its single pole number higher speed in response to the variations of the pulverized material in the space between the condenser plate within relatively close two operating levels of the order of ¼ to 1 inch within which the level of the material may be permitted to vary without materially impairing the efficiency of the operation and the fineness of the pulverized material.

Actual operating experience with the motor control arrangement described above has established that it will maintain the required close level control of the pulverized material in the revolving shell under varying load conditions and that this control will not be affected by wide variations in the moisture content of the material or dust cloud formations in the interior of the shell.

The operation of such condenser system may occasionally be disturbed because some metal particles, such as a broken wire, admixed to the material fed into the mill enters into the space between the level control condenser plates, thus producing a complete or partial direct connection between the plates. To protect the control system against such or similar fault conditions, a suitable alarm device, indicated in the drawing in the form of a meter or relay 150, is connected in the output circuit 114 of the detector so as to actuate a horn or other alarm device if a large output current produced by such partial or complete short-circuit flows through the detector output circuit.

The large variations of the output current in the output 114 of the detector may be utilized in many other ways for controlling the operation of the mill. As indicated diagrammatically in Fig. 1, the control arrangement 120 which is actuated by the output circuit 114, may be utilized to control either the disc feed motor 34 through the cable branch 152 or the feed plow control device 35 through the cable branch 153 of a control cable 151 extending from the control arrangement 120.

In operating mills of the type shown in Fig. 1 for supplying pulverized coal to boilers of power plants, the plow control device 35 is usually actuated in response to the boiler condition, for instance, by a pipe 154 leading from the steam space of the boiler so as to move the plow 33 to different positions along the feed disc 31 and thus vary the rate at which the material is fed to the mill in accordance with the steam demand. Any of the well known arrangements for subjecting the control action of the steam to a supplemental electrical control action by the electric control cable 153 may be used for controlling the plow position by the conjoint action of the boiler conditions and the level conditions in the mill in the way indicated diagrammatically in connection with Fig. 1.

Furthermore, since relatively small variations in the level of the powdered material in the mill produce relatively large variations of the output current in the detector output circuit 114 of the control system, these current variations may be utilized for actuating any of the well known continuous motor control arrangements for continuously varying and regulating the speed of the disc feed motor so as to maintain the level of the material in the mill within any desired close limits. For instance, a variable speed motor control of the type described in the article of D. D. Knowles in "Electronics" of June, 1933, may be used for such system.

As used in coal pulverizing plants for boiler plants in which the need for a satisfactory level control system was most acute, the control system of the invention maintains a predetermined required level of the pulverized material in the outlet region of the pulverizing mill so as to insure maximum output for a given mill size, a maximum continuous degree of fineness, large available reserve of coal in the mill shell, a minimum power consumption and minimum wear and maintenance of the pulverizing mill. Since the control system of the invention eliminates the deficiency of prior control systems, such as the clogging of the air suction control tubes, and permits quick, easy interchange and replacement of a defective control condenser unit by another control condenser unit, continuous efficient boiler service under optimum combustion conditions are secured under varying load conditions. Since the control circuit is electrically operated, it lends itself for full automatic control, and the operative condition of the individual elements of the system, such as the oscillator circuit, the control condenser, the control circuit, the output circuit, may be readily supervised so that any disturbance in their operation is automatically signalled by means well known in electronically operated devices. The control system of the invention enables thus the operation of pulverizing mills at a continuous maximum output for a given size with minimum variations in the fineness of the pulverized material, thus assuring, for instance, maintenance of the most favorable boiler combustion conditions under varying loads.

The principles of the invention described above may be utilized in many other operating structures having a confined operating space requiring a control system for maintaining predetermined operating conditions in the confined structure.

In accordance with the principles of the invention, such confined operating structure may be provided with control means having a control circuit including a control element operatively exposed to the interior of the confined structure cooperating with oscillator means disposed outside the confined space of the structure arranged to produce in the control circuit predetermined electric oscillations varying in a predetermined manner in response to predetermined variations of the operating conditions in the immediate proximity of the control element irrespective of other variable operating conditions of said structure so as to maintain by the action of the control means predetermined operating conditions in the confined operating structure in response to the actuation of the control means by variations of the control circuit oscillations.

Furthermore, a single confined operating structure, such as a pulverizing mill having two or more feed inlets, may be provided with several control units, one for each feed inlet, for controlling different operating conditions of the structure, or for supplementing the control action of one element with the control action of another element.

The principles and the features of invention described hereinabove will suggest many other modifications thereof. Thus, in Fig. 9 is illustrated a modified control condenser arrangement. It comprises a condenser unit 160 forming an impact-proof housing having two downwardly extending rigid condenser plate projections 161 facing the opposite sides of an inner condenser plate 162 insulatingly mounted on an insulating spacer 163 clamped between the interfitting portions of the condenser housing 160 and the adjoining elbow 164. The condenser plates 161 and 162 of the condenser unit are shaped and arranged to prevent the steel impact balls from coming into contact with the inner condenser plates 162.

Means are also provided for admitting gas under pressure into the space between the condenser plates so as to assure that this space does not become clogged by admitting either periodically or continuously a stream of gas which assures that the level of the powdered material between the condenser plates varies in accordance with the variations of the level of the material in the mill. In the embodiment shown, a gas inlet nozzle 166 extending through the condenser housing 160 is arranged to admit and discharge air or gas under pressure to the plates 161, 162 for preventing powdered material entering between the plates from becoming clogged between the condenser plates 161, 162, and to assure that the level of the powdered material entering between the condenser plates 161, 162 rises and falls in accordance with the level of the material in the region adjacent the condenser unit. The outer condenser member 160 may be provided with outlet openings 167 through which powdered material entering into the space above the condenser plates may drop out.

With such arrangement, the gas discharge into the condenser unit as well as the impact actions to which it is subjected assure that the level of the material between the condenser plates corresponds to the level of the material in the mill.

The condenser unit is supported by a tubular condenser arm 170 which serves as a shielding terminal lead enclosing an inner insulated lead 171 to the outer condenser plates 161 and the inner condenser plate 162, respectively. The condenser arm is provided with a universal joint support formed of a sleeve member 173 having an exterior ball-shaped surface seated in a ball socket member 174 held between the arms 176 of a cradle-like support 177 of a pedestal 178 extending from the base of the mill. The rear of the condenser arm 170 has a spherical closure plate 180 slidable over a guide wall 181 of an extension of the air inlet chamber 139 to permit tilting of the condenser arm and adjustment of the location of the condenser plate elements 161, 162 in the required level regulating position. The arm may be locked in the adjusted position by a clamping plate 182 which is suitably clamped to the guide wall 181. The exposed outer end of the condenser arm arrangement 170 with its interior shielded condenser lead 171 are connected to the circuit casing and the circuits therein by a bellows-like structure 184 as in the arrangement of Fig. 1. A gas supply duct 179 extending from the discharge nozzle 166 along the condenser arm 170 is utilized to supply either continuously or periodically preheated air or gas under pressure for preventing the space between the condenser plates 161, 162 from becoming clogged. Alternatively, the tubular arm 170 may be utilized as the gas supply duct for discharging gas between the condenser plates 161, 162.

In Fig. 11 is shown a modified form of control circuit arrangement which may be used in lieu of the control arrangement described in connection with Fig. 1. In this arrangement the oscillator circuit and the detector circuit, which are arranged and connected in a way similar to the corresponding parts of the arrangement shown in Fig. 1, are operated, instead of with direct current energy, with alternating energy supplied from the secondary winding 190 of a supply transformer. In this arrangement one point of the transformer winding 190 is grounded at 191 and the high voltage end of the winding is connected through a high frequency choke coil 192 to an anode supply lead 193 connected to the anode circuits of the oscillator tube 85 and the detector tube 110. Proper bias potential for the input grids of the tube may be supplied through an additional tap of the transformer winding.

Although a circuit arrangement as shown in Fig. 11 which is supplied from a commercial alternating current line operating at 60 cycles will maintain the oscillating circuit and the detector circuit operative only during one half cycle, such arrangement will operate satisfactorily in operating a level control system of the invention because with the proper adjustment of the phase relationships of the several elements of the circuit arrangement, such intermittent operation will give the required control section.

The features of the invention residing in the utilization of a control condenser connected in a circuit which is resonant for oscillatory currents of a frequency different than the oscillatory currents impressed upon the circuit may be used in many other applications.

In Fig. 11 is illustrated the utilization of such control arrangement for a boiler level control. A boiler vessel 200 having water maintained at a level 201 is shown provided with a water gauge 203 in the form of a glass tube having connections to the water space in the boiler and to the boiler space above the water. A portion of the glass tube is surrounded by an insulated condenser element 206 which, in conjunction with the grounded water column inside the glass, forms a level control condenser connected in the control circuit including the windings 80 and the other elements of a control arrangement of the type described in connection with Fig. 1.

By suitable adjustment of the various elements of the control system shown in Fig. 11, variations in the level of the water glass 203 will vary the effective capacitive impedance of the condenser element formed by the water column and the condenser element 206. As a result, the current in the output circuit 210 of the detector tube 110 will undergo variations corresponding to the variations of the level of the water, and the current variations in the output windings 210 may be utilized to control the operation of the boiler either by controlling the combustion or the water supply so as to maintain the desired operating conditions in the boiler.

The principles underlying the control systems of the invention, to which the present application is directed, are not limited to the particular sets of frequency ranges given hereinabove in connection with the specific level control arrangement described in connection with Figs. 1 to 4.

In general, a level control system, such as shown in Figs. 1 to 4, may be represented by the diagrammatic block diagram of Fig. 12 showing a level control condenser 50 with its condenser plates 51, 52, located in the region of the normal level N at which the pulverized material is to be maintained in the revolving shell 20 of an impact pulverizer. The control condenser 50 forms part of a bridge circuit 80 to which oscillations of a predetermined frequency are supplied by an oscillator 85 which is energized by a positive supply lead (+), for instance.

The pulverized material is maintained near the desired level N by regulating the operation of the mill, for instance, through variation of the speed of a driving motor 34 of the feed mechanism which feeds the material to be pulverized to the mill, with a regulating arrangement 120 that is actuated by a detector arrangement 110 which is arranged to operate in response to predetermined unbalancing conditions of the bridge circuit that result from a rise or fall of the level of the pulverized material, so as to maintain it within the desired range, for instance, between the high level H and the low level L.

The effectiveness of such level control system is determined by the sensitivity of the bridge circuit 80 to variations of the level of material entering between the plates of the level control condenser 50.

As shown in Fig. 12, the bridge circuit has two arms formed by the two transformer winding sections 81, one arm formed by the level control condenser 50 and another arm formed by the auxiliary condenser 83. The other auxiliary condenser 82, which is shown connected in the arm of the level control condenser 50, is used only for balancing purposes and may be omitted if the condenser 83 of the other bridge arm has a variable capacity range sufficient for adjusting the bridge to the desired point of sensitivity at which a small change in the level of the material entering between the level condenser plates 51, 52 gives between the ground terminal G and the diametrically opposite detector circuit terminal 84 of the bridge, the change in voltage required for performing the control operations. Such level control system presents difficult operating problems because the level control condenser has to be extremely small, and its capacity, which has to be limited to a value in the range between $10^{-9}$ and $10^{-12}$ farad or even less, is of the same order as the capacity of the leads 57, 58 through which it is interconnected with the other elements of the bridge circuit. The problem is further aggravated by the fact that, since the moisture content of the materials and other factors governing the leakage resistance which is effective in shunt to the level condenser plates 51, 52, affect the sensitivity of the bridge circuit, it must be energized with an oscillating current of a predetermined frequency that is sufficiently high to render the control action substantially independent of variations of the effective leakage resistance, while keeping the frequency below a value at which variations of the order of about ¼ inch in the level of the material entering between the level condenser plates 51, 52 produce between the detector terminals of the bridge circuit a consistent definite corresponding voltage difference of the order of about ½ or 1 millivolt or more sufficient to drive the first stage of an electron tube amplifier.

Depending on the character of the material that is subjected to the pulverizing action and the factors governing its leakage resistance, the bridge circuit of the level control condenser 50 has to be operated with a predetermined frequency higher than about 10 kilocycles and less than about 300 kilocycles, the frequency being so chosen as to be high enough to minimize to the required degree the effect of the leakage resistance on the control operation, and sufficiently lower than the high radio frequencies so as to assure that the variations of the capacity of the level control condenser caused by the differences of the order of ¼ to 1 inch in the level of material entering between its plates have a controlling effect on the operation of the bridge circuit and impressing on the detector circuit a voltage difference in the range of about 1 millivolt to 1 volt or more, that is sufficient for carrying out the regulating functions in the way described hereinabove.

I have found that the sensitivity of such level control systems may be greatly increased by arranging the bridge circuit connected to the level control condenser 50 so that the oscillating currents flowing in each side of the bridge circuit extending between its detector terminals 84 and G are equal in amplitude as well as in phase when the pulverizer is in the desired operating condition, for instance, with the material maintained at the desired level N.

In the control arrangement of the type shown in Fig. 12, the leakage resistance which affects the operation of the control condenser 50 may be represented by resistance 201 acting in shunt between the outer and inner condenser plates 51, 52 of the control condenser. In order to increase the sensitivity of such bridge circuit and make it possible to balance it so as to maintain, during normal operating conditions, the currents flowing in both sides of the bridge extending between the detector circuit terminals equal in amplitude as well as in phase, the condenser 83, which is connected in the side of the bridge opposite to the level control condenser 50, has connected thereto an adjustable rheostat 202 so as to make it possible to balance the reactance as well as the resistance in each side of the bridge circuit, notwithstanding the effect of the leakage resistance 201 acting in shunt to the level control condenser.

With such arrangement, it is possible to adjust the bridge circuit so that when the material is maintained at the desired operating level N, the voltage between the diametrically opposite terminals 84 and G of the bridge, to which the detector 110 is connected, will be zero, and that a variation of about ¼ to 1 inch in the level of the material entering between the level control condenser plates 51, 52 produces a relatively sharp unbalance in the bridge circuit and develops at the detector terminals of the bridge a substantial control voltage of the order of ½ to more millivolts that is sufficient to enable an electronic tube detector arrangement to perform effectively its required regulating operations in the way described hereinabove.

By using for the level control arrangement a bridge circuit arranged so that the leakage resistance, which acts in shunt to the level control condenser, may be counterbalanced in the way described above, the limitations on the frequency of the oscillations which have to be impressed on the bridge circuit are less critical, and the bridge circuit may be operated with an oscillating current of a frequency in the range up to 500 kilocycles or even higher.

Fig. 13 illustrates another form of a level control arrangement of the general type shown in Fig. 12. Instead of using the transformer windings 81 as a part of the bridge circuit, an intermediate rheostat 206 which is connected between the terminals of the transformer winding forms two arms of the bridge circuit, and an intermediate adjustable tap 205 serves as its detector terminal which in conjunction with the diametrically opposite ground terminal G of the bridge circuit impresses a control voltage on the detector 110, as in the arrangement of Fig. 12.

In addition, the bridge circuit has an arm formed of a concentric conductor element 210 shown in the form of a coil having an outer lead 211 enclosing the inner lead 212 that is insulated therefrom and has a capacitive effect which balances the capacitive effect of the level control condenser 50 and its concentric supporting arm and circuit connection elements 57, 58 on which it is carried within the mill shell 20. The concentric conductor element 210 is proportioned so as to have substantially the same capacitive effect as the level control condenser 50 and its concentric arm elements 57, 58 which form the support and the circuit connection to the level control condenser 50.

As in the arrangement of Fig. 12, an adjustable rheostat 202 is connected in shunt to the condenser elements formed by the concentric conductor element 210 of the bridge circuit, so that when the condenser is maintained at the desired level of the material, the currents flowing in the two sides of the bridge circuit extending between the detector input terminals 205 and G may be adjusted to be substantially equal in amplitude as well as in phase, for securing a highly sensitive control action.

In addition, the arrangement of Fig. 13 is also provided with means for automatically compensating for variations in the leakage resistance 201 of the pulverized material which shunts the level control condenser 50. In the form shown, a rheostat 202 is connected to the bridge condenser element 210, and its arm turned by a shaft 215 which is operated by a compensating arrangement 213 which is connected through two leads 214 to the leads of the level control condenser plates 51, 52 between which the leakage resistance 201 is effective. The compensating arangement 213 is so designed to vary the value of the effective resistance of the rheostat 202 in response to the variations of the leakage resistance 201 as to keep at all times the resistance connected in shunt to the bridge condenser element 219 at a value corresponding to the effect of the leakage resistance acting in shunt to the level control condenser 50.

Any of the known automatic rheostat control arrangements, for instance, such as the "Micromax" control arrangement described in catalog N-33A, of the Leeds & Northrup Company, published in 1937, may be used for automatically adjusting the rheostat 202 so as to compensate for variations in the leakage resistance 201 acting in shunt to the level control condensor 50.

Although the arrangement of Fig. 13 shows the auxiliary condensers 82, 83 connected in the two arms of the bridge formed by the level control condenser 50 and the concentric conductor element 210, these condensers may be omitted and direct connections may be provided from the ends of the potentiometer resistor 206 to the level control condenser 50 and the condenser element 210, if other elements of the bridge circuit permit its proper initial adjustment.

Instead of using the concentric conductor element 210, any plate or sheet-like condenser arrangement having the same capacitive effect as the control condenser 50 with the two concentric connector-arm elements 57, 58 on which it is carried may be used.

In Fig. 14 is shown a modified form of a level control condenser for eliminating the disturbing leakage resistance effects. The inner condenser plate 162 of the control condenser is enclosed between two layers of insulating material 217 and its lead 171 through which it is connected to the bridge circuit is covered with an insulating covering so as to assure that under all operating conditions, the leakage resistance between the inner condenser plate 162 and the outer condenser plate 161 shall be maintained at a high value, irrespective of variations in the leakage resistance of the material entering between the condenser plates.

Any of the well known synthetic resin materials having a high leakage resistance may be used for the insulating enclosure 217, and the inner condenser plate 162 may be made in the form of a metal sheet embedded between thin layers of such insulating material. The insulating layers extending over the surface of the inner condenser plates should be as thin as possible, for instance, of the order of $\frac{1}{16}$ of an inch or less, in order to assure that small variations in the level of the material entering between the condenser plates gives a sufficient change in its effective capacity required for producing at the detector terminals of the control circuit bridge the control voltage required for performing the regulating functions described above.

The insulating enclosure 217 of the level control condenser 160 serves also as protection against the occurrence of explosions that might occur due to the application of an excessive voltage to the condenser 160, which, in the case of a coal pulverizer mill, may bring about an ignition of an explosive mixture formed incident to the coal pulverizing action.

In level control systems of the type herein described, it may also be important to compensate for the difference between the dielectric constant of the material that is pulverized and the dielectric constant of another substance admixed thereto, such as in the case of coal holding much moisture. For instance, the dielectric constant or the inductive capacity of coal is less than about 4 while that of water is about 80. Accordingly, if the material that is subjected to the pulverizing action has admixed thereto a substantial quantity of a substance having a materially different dielectric constant, the operation of such level control system may be disturbed.

In Fig. 15 is shown one form of a level control arrangement of the type described in connection with Fig. 13 modified so as to compensate for variations in the dielectric constant of the material subjected to the pulverizing action. This control arrangement has, in addition to the level control condenser 50, a secondary control condenser 220 formed of condenser plates 221 arranged and held spaced so that during operation of the system, a predetermined volume of the material that is being pulverized passes through the space between its two condenser plates 221. The secondary control condenser forms a part of a second bridge circuit 230, which, like the similar bridge circuit 80 of the level control circuit, is supplied with oscillations from the oscillator 85.

The elements of the secondary bridge circuit are so designed, arranged and adjusted that the variations of the dielectric constant of the material confined between the plates of the secondary condenser 220 develop a corresponding predetermined voltage variation across the two detector terminals 233, G of the secondary bridge. The developed voltage variations are impressed through a lead 235 on the detector arrangement 110, which is designed to operate in response to the conjoint action of the voltages impressed thereon by the two bridge circuits 80 and 220 as to control the operation of the regulating arrangement 120 in such a way as to maintain the material in the shell 20 at the desired level while automatically compensating for variations in the dielectric constant of the pulverized material as well as for variations in the leakage resistance of the material. Any well known arrangement for combining two voltage components in a common detector circuit, so as to give resulting control operation corresponding to the two controlling voltages, may be used.

The secondary control condenser 220 is preferably formed of two metallic sheets located on the opposite sides of the volume which is to be filled with the material that is pulverized, and the exterior of the surfaces of the two condenser plates 221 are separated by insulating barriers from the surrounding space so that for all practical purposes only the variations of the dielectric constant of the material in the space between the two facing condenser plates determine the variations of its capacitive effect on the bridge circuit.

Depending on the conditions, the inwardly facing surfaces of the two condenser plates 221 may likewise be covered by a thin layer of insulating material so as to maintain their leakage resistance high. The insulation of the condenser plates is also desirable because it excludes the possibility of an explosion due to the application of an abnormally high potential between the condenser plates, as explained hereinbefore.

The secondary condenser 220, may be mounted on the end of a supporting arm, similar to the supporting arm of the level control condenser, arranged so as to hold the upper level of the secondary condenser 220 slightly below the lowest level of the pulverized material in the rotating shell enclosure 20, so that the space between its plates is always filled with the material. In order to assure that as the pulverizing process proceeds fresh material enters the space of the exploring condenser, the arm which supports the secondary condenser 220 may be subjected to a shaking action. Any vibrating mechanism may be used for this purpose, although in the pulverizing arrangement of the type here described, the rolling motion of the balls will be sufficient to impart to the exploring condenser such shaking action.

Figure 16:
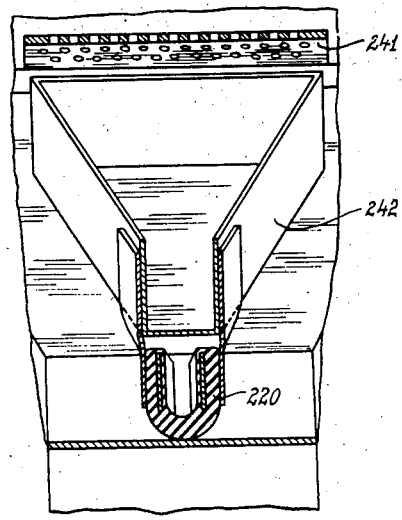
Fig. 16 is a cross-sectional view along line 16—16 of Fig. 15.

Instead of locating the exploring condenser below the level of the pulverized material in the condenser, it may be located in the path of the material that is fed by the hopper 32' to the pulverizing mill, in the way shown in Figs. 15 and 16. In the upper portion of the hopper is located an inclined screen 241 along which the material which is fed to the hopper slides down. Underneath the screen 241 is placed a deflector chute 242 which deflects the finely grained material passing through the screen 241 into the space between the inner surfaces of the secondary condenser 220'.

The secondary condenser 220' is located close to the inclined bottom wall of the hopper 32' and its inwardly facing condenser surface converges slightly in downward direction and acts like a gate which is at all times filled with fine coal material dropping into it and overflowing on its way toward the bottom of the hopper and therethrough into the pulverizing mill. The gate formed by the exploring condenser 220' is so positioned in relation to the deflecting chute 242 and the adjacent walls of the hopper, that there is always an overflow of the finely grained material so that it is at all times fully filled with it as it flows downwardly into the mill.

The screen 241 may be arranged so as to serve as a support which carries through arm extensions the underlying deflector chute 242 and the latter is arranged to carry in its position the underlying secondary condenser 220', so as to maintain the several elements in their properly spaced positions. In addition, the screen 241 may be mouned so as to be subjected to a shaking operation, for instance, by a suitable eccenter drive connection to the shaft of the motor 34, so that the screen with the chute and the secondary control condenser 220' are subjected to a limited shaking motion.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In a control system for an impact pulverizer having a revolving enclosure containing grinding means and material subjected to pulverization by the revolving action of the enclosure, control means having a control circuit which is resonant at a radio frequency including a circuit control condenser having relatively small effective condenser areas separated by a condenser space exposed to the interior of the enclosure, oscillator means outside said enclosure for impressing on said control circuit predetermined electric oscillations of a frequency that is of the order of a tenth of the resonant frequency of said control circuit and so chosen that at the frequency of the impressed oscillations, the reactive impedance of the control condenser is a multiple of the reactive impedance of the part of the control circuit connected in series therewith and is materially modified by changes in the level of the material in the proximity of said condenser, but is only relatively little affected by variations of the leakage resistance of the material in the proximity of said condenser, said control circuit, said circuit control condenser, said oscillator means and other associated elements of said control means being arranged, proportioned and correlated to cause said control condenser to produce in response to predetermined variations of the operating conditions in the proximity of said control condenser correlated variations of the oscillations in said circuit, and pulverizer operating means actuated by said control means for maintaining predetermined operating conditions in said enclosure in response to the actuation of said control means by variations in the oscillations in said control circuit.

2. In a control system for an operating structure having a confined operating space, operating means for operating said structure, control means having a control circuit of a relatively high resonant frequency of the order of 1000 kilocycles including a circuit control condenser having relatively small effective condenser areas separated by a condenser space operatively exposed to the interior space of said structure, and oscillator means outside said structure for impressing on said control circuit predetermined electric oscillations of a frequency of the order of 100 kilocycles so that at the frequency of the impressed oscillations, the reactive impedance of the control condenser is a multiple of the reactive impedance of the part of the control circuit connected in series therewith and is materially modified by changes in the level of the material in the proximity of said condenser, but is only relatively little affected by variations of the leakage resistance of the material in the proximity of said condenser, said control circuit, said circuit control condenser, said oscillator means and other associated elements of said control means being arranged, proportioned and correlated to cause said control condenser to produce in response to predetermined variations of the operating conditions in the proximity of said control condenser correlated variations of the oscillations in said circuit, said operating means being actuated by said control means in response to variations of the oscillations in said control circuit to maintain in said structure operating conditions which confine within a predetermined range the variations of the operating conditions in the structure.

3. In a control system for an impact pulverizer having a revolving enclosure containing material subjected to pulverization by the revolving action of the enclosure, pulverizer operating means, control means having a control circuit which is resonant at a radio frequency including a circuit control condenser having relatively small effective areas separated by a condenser space exposed to the interior of the enclosure, and oscillator means outside said enclosure for impressing on said control circuit predetermined electric oscillations of a frequency that is of the order of a tenth of the resonant frequency of said control circuit and so chosen that at the frequency of the impressed oscillations, the reactive impedance of the control condenser is a multiple of the reactive impedance of the part of the control circuit connected in series therewith and is materially modified by changes in the level of the material in the proximity of said condenser, but is only relatively little affected by variations of the leakage resistance of the material in the proximity of said condenser, said control circuit, said circuit control condenser, said oscillator means and other associated elements of said control means being arranged, proportioned and correlated to cause said control condenser to produce in response to predetermined variations of the operating conditions in the proximity of said control condenser correlated variations of the oscillations in said circuit, said pulverizer operating means being actuated by said control means in response to variations of the oscillations in said control circuit to maintain in said enclosure operating conditions which confine within a predetermined range the variations of the operating conditions in the enclosure to which the circuit control element responds.

4. In a control system for an impact pulverizer having a revolving enclosure containing impact members and material subjected to pulverization by the revolving action of the enclosure, pulverizer operating means, control means having a control circuit which is resonant at a radio frequency including a control condenser having relatively small effective areas of opposite polarity positioned in a region of the enclosure in which the material to be pulverized has to be maintained within a predetermined range of levels, and oscillator means outside said enclosure for impressing on said control circuit predetermined electric oscillations of a frequency that is of the order of a tenth of the resonant frequency of said control circuit and so chosen that at the frequency of the impressed oscillations, the reactive impedance of the control condenser is a multiple of the reactive impedance of the part of the control circuit connected in series therewith and is materially modified by changes in the level of the material in the proximity of said condenser, but is only relatively little affected by variations of the leakage resistance of the material in the proximity of said condenser, said control circuit, said circuit control condenser, said oscillator means and other associated elements of said control means being arranged, proportioned and correlated to cause said control condenser to produce in response to predetermined variations of the level of the material in the proximity of said control condenser correlated variations of the oscillations in said circuit, said pulverizer operating means being actuated by said control means in response to variations of the oscillations in said control circuit to maintain in said enclosure operating conditions which confine within a predetermined range the variations of the level of the material in the enclosure.

5. In a control system for an impact pulverizer having a revolving enclosure containing impact members and material subjected to pulverization by the revolving action of the enclosure, pulverizer operating means, control means having a control circuit which is resonant at a radio frequency including a control condenser having relatively small effective areas of opposite polarity positioned in a region of the enclosure in which the material to be pulverized has to be maintained within a predetermined range of levels, and oscillator means outside said enclosure for impressing on said control circuit predetermined electric oscillations of a frequency that is of the order of a tenth of the resonant frequency of said control circuit and so chosen that at the frequency of the impressed oscillations, the reactive impedance of the control condenser is a multiple of the reactive impedance of the part of the control circuit connected in series therewith and is materially modified by changes in the level of the material in the proximity of said condenser, but is only relatively little affected by variations of the leakage resistance of the material in the proximity of said condenser, said control circuit, said control condenser, said oscillator means and other associated elements of said control means being arranged, proportioned and correlated to cause said control condenser to produce in response to predetermined variations of the level of the material in the proximity of said control condenser correlated variations of the oscillations in said circuit, said pulverizer operating means being actuated by said control means in response to variations of the oscillations in said control circuit to maintain in said enclosure operating conditions which confine within a predetermined range the variations of the level of the material in the enclosure.

6. In a control system for an impact pulverizer having a revolving enclosure containing grinding means and material subjected to pulverization by the revolving action of the enclosure, control means having a control circuit which is resonant at a radio frequency including a circuit control condenser having relatively small effective areas separated by a condenser space exposed to the interior of the enclosure, oscillator means outside said enclosure for impressing on said control circuit predetermined electric oscillations of a frequency that is sufficiently lower than one-fifth and sufficiently higher than one-twentieth of the resonant frequency of said control circuit and so chosen that at the frequency of the impressed oscillations, the reactive impedance of the control condenser is a multiple of the reactive impedance of the part of the control circuit connected in series therewith and is materially modified by changes in the level of the material in the proximity of said condenser, but is only relatively little affected by variations in the proximity of said condenser, said control circuit, said circuit control condenser, said oscillator means and other associated elements of said control means being arranged, proportioned and correlated to cause said control condenser to produce in response to predetermined variations of the operating conditions in the proximity of said control condenser correlated variations of the oscillations in said circuit, and pulverizer operating means actuated by said control means for maintaining predetermined operating conditions in said enclosure in response to the actuation of said control means by variations in the oscillations in said control circuit, the circuit connections between said circuit control condenser inside the revolving enclosure and the oscillator means outside the enclosure including a hollow supporting member projecting into the enclosure and forming a support for said control condenser.

7. In a control system for an impact pulverizer having a revolving enclosure containing impact members and material subjected to pulverization by the revolving action of the enclosure, pulverizer operating means including means for feeding material to the enclosure, control means having a control circuit which is resonant at a radio frequency including a control condenser having relatively small effective areas of opposite polarity positioned in a region of the enclosure in which the material has to be maintained within a predetermined range of levels and variations of the level of the material vary the effective inductive capacity in the spaces between said condenser areas, and oscillator means outside said enclosure for impressing on said control circuit predetermined electric oscillations of a frequency that is of the order of a tenth of the resonant frequency of said control circuit and so chosen that at the frequency of the impressed oscillations, the reactive impedance of the control condenser is a multiple of the reactive impedance of the part of the control circuit connected in series therewith and is materially modified by changes in the level of the material in the proximity of said condenser, but is only relatively little affected by variations of the leakage resistance of the material in the proximity of said condenser, said control circuit, said control condenser, said oscillator means and other associated elements of said control means being arranged, proportioned and correlated to cause said control condenser to produce in response to predetermined variations of the level of the material in the proximity of said control condenser correlated variations of the oscillations in said circuit, said feeding means being actuated by said control means in response to variations of the oscillations in said control circuit to maintain in said enclosure operating conditions which confine within a predetermined range the variations of the level of the material in the enclosure.

8. In a control system for an impact pulverizer having a revolving enclosure containing impact members and material subjected to pulverization by the revolving action of the enclosure, pulverizer operating means, control means having a control circuit of a relatively high resonant frequency of the order of 1000 kilocycles including a control condenser having relatively small effective areas of opposite polarity positioned in a region of the enclosure in which the material has to be maintained within a predetermined range of levels and variations of the level of the material vary the effective inductive capacity in the spaces between said condenser areas, and oscillator means outside said enclosure for impressing on said control circuit predetermined electric oscillations of a frequency that is sufficiently lower than about one-fifth and sufficiently higher than about one-twentieth of said resonant frequency and so chosen that at the frequency of the impressed oscillations, the reactive impedance of the control condenser is a multiple of the reactive impedance of the part of the control circuit connected in series therewith and is materially modified by changes in the level of the material in the proximity of said condenser, but is only relatively little affected by variations of the leakage resistance of the material in the proximity of said condenser, said control circuit, said control condenser, said oscillator means and other associated elements of said control means being arranged, proportioned and correlated to cause said control condenser to produce in response to predetermined variations of the level of the material in the proximity of said control condenser correlated variations of the oscillations in said circuit, said pulverizer operating means being actuated by said control means in response to variations of the oscillations in said control circuit to maintain in said enclosure operating conditions which confine with a predetermined range the variations of the level of the material in the enclosure.

9. In a control system for an impact pulverizer having a revolving enclosure containing impact members and material subjected to pulverization by the revolving action of the enclosure, pulverizer operating means, control means having a control circuit of a relatively high resonant frequency of the order of 1000 kilocycles including a control condenser having relatively small effective areas of opposite polarity positioned in a region of the enclosure in which the material has to be maintained within a predetermined range of levels and variations of the level of the material vary the effective inductive capacity in the spaces between said condenser areas, and circuit leads from said control condenser constituting in conjunction with the other elements of said control circuit a capacity of the order of the capacity of said control condenser, oscillator means outside said enclosure for impressing on said control circuit predetermined electric oscillations of a frequency of the order of 100 kilocycles and so chosen that at the frequency of the impressed oscillations, the reactive impedance of the control condenser is a multiple of the reactive impedance of the part of the control circuit connected in series therewith and is materially modified by changes in the level of the material in the proximity of said condenser, but is only relatively little affected by variations of the leakage resistance of the material in the proximity of said condenser, said control circuit, said control condenser, said oscillator means and other associated elements of said control means being arranged, proportioned and correlated to cause said control condenser to produce in response to predetermined variations of the level of the material in the proximity of said control condenser correlated variations of the oscillations in said circuit, said pulverizer operating means being actuated by said control means in response to variations of the oscillations in said control circuit to maintain in said enclosure operating conditions which confine within a predetermined range the variations of the level of the material in the enclosure.

10. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of a bridge circuit that is resonant at a radio frequency, and that the capacitive impedance of the control condenser is of the order of the capacitive impedance of said connector elements; oscillator means outside said enclosure for impressing on said bridge circuit predetermined electric oscillations of a frequency in the range between about 10 and 300 kilocycles per second at which changes in the reactive impedance of the control condenser caused by variations in the level of the material of the order of a quarter of an inch produce between a control terminal of an external circuit portion of said bridge circuit and another control terminal of said bridge circuit correspondingly varying control voltages of the order of about one-half a millivolt or more; said pulverizer operating means being actuated by said control means so as to maintain the level of the material in said enclosure within a predetermined range in response to the actuation of said control means by variations in the oscillations in said control circuit.

11. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of a bridge circuit that is resonant at a radio frequency, and that the capacitive impedance of the control condenser is of the order of the capacitive impedance of said connector elements; oscillator means outside said enclosure for impressing on said bridge circuit predetermined electric oscillations of a frequency in the range between about 10 and 300 kilocycles per second at which changes in the reactive impedance of the control condenser caused by variations in the level of the material of the order of a quarter of an inch produce between a control terminal of an external circuit portion of said bridge circuit and another control terminal of said bridge circuit correspondingly varying control voltages of the order of about one-half a millivolt or more; the frequency of the impressed oscillations being so chosen that at the frequency of said oscillations the reactive impedance of said control condenser is a multiple of the reactive impedance of the part of the control circuit connected in series therewith and materially modified by changes in the level of the material in the proximity of said condenser, but is only little affected by variations of the leakage resistance of the material in the proximity of said condenser; said pulverizer operating means being actuated by said control means so as to maintain the level of the material in said enclosure within a predetermined range in response to the actuation of said control means by variations in the oscillations in said control circuit.

12. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of one arm of a bridge circuit that is resonant at a radio frequency and has two pairs of diametrically arranged terminal points, and that the capacitive impedance of the control condenser is of the order of the capacitive impedance of said connector elements; oscillator means outside said enclosure for impressing on said bridge circuit predetermined electric oscillations of a frequency in the range between about 10 and 100 kilocycles per second at which changes in the reactive impedance of the control condenser caused by variations in the level of the material of the order of a quarter of an inch produce between a control terminal of an external circuit element and another control terminal of said control circuit correspondingly varying control voltages of the order of about one-half a millivolt or more; said control terminals constituting terminal points of said bridge circuit; said pulverizer operating means being actuated by said control means so as to maintain the level of the material in said enclosure within a predetermined range in response to the actuation of said control means by variations in the oscillations in said control circuit.

13. In a level control system for an operating structure having an enclosure confining material that has to be maintained at a level of a predetermined range during predetermined variations in the operating conditions of said structure; operating means for said operating structure; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of a bridge circuit that is resonant at a radio frequency, and that the capacitive impedance of the control condenser is of the order of the capacitive impedance of said connector elements; oscillator means outside said enclosure for impressing on said bridge circuit predetermined electric oscillations of a frequency in the range between about 10 and 300 kilocycles per second at which changes in the reactive impedance of the control condenser caused by variations in the level of the material of the order of a quarter of an inch produce between a control terminal of an external circuit portion of said bridge circuit and another control terminal of said bridge circuit correspondingly varying control voltages of the order of about one-half a millivolt or more; said operating means being actuated by said control means so as to maintain the level of the material in said enclosure within a predetermined range in response to the actuation of said control means by variations in the oscillations in said control circuit.

14. In a level control system for an operating structure having an enclosure confining material that has to be maintained at a level of a predetermined range during predetermined variations in the operating conditions of said structure; operating means for said operating structure; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of a bridge circuit that is resonant at a radio frequency, and that the capacitive impedance of the control condenser is of the order of the capacitive impedance of said connector elements; oscillator means outside said enclosure for impressing on said bridge circuit predetermined electric oscillations of a frequency in the range between about 10 and 300 kilocycles per second at which changes in the reactive impedance of the control condenser caused by variations in the level of the material of the order of a quarter of an inch produce between a control terminal of an external circuit portion of said bridge circuit and another control terminal of said bridge circuit correspondingly varying control voltages of the order of about one-half a millivolt or more; the frequency of the impressed oscillations being so chosen that at the frequency of said oscillations the reactive impedance of said control condenser is a multiple of the reactive impedance of the part of the control circuit connected in series therewith and materially modified by changes in the level of the material in the proximity of said condenser, but is only little affected by variations of the leakage resistance of the material in the proximity of said condenser; said operating means being actuated by said control means so as to maintain the level of the material in said enclosure within a predetermined range in response to the actuation of said control means by variations in the oscillations in said control circuit.

15. In a level control system for an operating structure having an enclosure confining material that has to be maintained at a level of a predetermined range during predetermined variations in the operating conditions of said structure; operating means for said operating structure; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of one arm of a bridge circuit that is resonant at a radio frequency and has two pairs of diametrically arranged terminal points, and that the capacitive impedance of the control condenser is of the order of the capacitive impedance of said connector elements; oscillator means outside said enclosure for impressing on said bridge circuit predetermined electric oscillations of a frequency in the range between about 10 and 100 kilocycles per second at which changes in the reactive impedance of the control condenser caused by variations in the level of the material of the order of a quarter of an inch produce between a control terminal of an external circuit element and another control terminal of said control circuit correspondingly varying control voltages of the order of about one-half a millivolt or more; said control terminals constituting terminal points of said bridge circuit; said operating means being actuated by said control means so as to maintain the level of the material in said enclosure within a predetermined range in response to the actuation of said control means by variations in the oscillations in said control circuit.

16. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of a bridge circuit that is resonant at a radio frequency, and that the capacitive impedance of the control condenser is of the order of the capacitive impedance of said connector elements; oscillator means outside said enclosure for impressing on said bridge circuit predetermined electric oscillations of a frequency in the range between about 10 and 300 kilocycles per second at which changes in the reactive impedance of the control condenser caused by variations in the level of the material of the order of a quarter of an inch produce between a control terminal of an external circuit portion of said bridge circuit and another control terminal of said bridge circuit correspondingly varying control voltages of the order of about one-half a millivolt or more; said pulverizer operating means being actuated by said control means so as to maintain the level of the material in said enclosure within a predetermined range in response to the actuation of said control means by variations in the oscillations in said control circuit; said control means including means for compensating for variations in the leakage resistance of the material.

17. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of a bridge circuit that is resonant at a radio frequency, and that the capacitive impedance of the control condenser is of the order of the capacitive impedance of said connector elements; oscillator means outside said enclosure for impressing on said bridge circuit predetermined electric oscillations of a frequency in the range between about 10 and 300 kilocycles per second at which changes in the reactive impedance of the control condenser caused by variations in the level of the material of the order of a quarter of an inch produce between a control terminal of an external circuit portion of said bridge circuit and another control terminal of said bridge circuit correspondingly varying control voltages of the order of about one-half a millivolt or more; the frequency of the impressed oscillations being so chosen that at the frequency of said oscillations the reactive impedance of said control condenser is a multiple of the reactive impedance of the part of the control circuit connected in series therewith and materially modified by changes in the level of the material in the proximity of said condenser, but is only little affected by variations of the leakage resistance of the material in the proximity of said condenser; said pulverizer operating means being actuated by said control means so as to maintain the level of the material in said enclosure within a predetermined range in response to the actuation of said control means by variations in the oscillations in said control circuit; said control means including means for compensating for variations in the leakage resistance of the material.

18. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connecter elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of one arm of a bridge circuit that is resonant at a radio frequency and has two pairs of diametrically arranged terminal points, and that the capacitive impedance of the control condenser is of the order of the capacitive impedance of said connector elements; oscillator means outside said enclosure for impressing on said bridge circuit predetermined electric oscillations of a frequency in the range between about 10 and 100 kilocycles per second at which changes in the reactive impedance of the control condenser caused by variations in the level of the material of the order of a quarter of an inch produce between a control terminal of an external circuit element and another control terminal of said control circuit correspondingly varying control voltages of the order of about one-half a millivolt or more; said control terminals constituting terminal points of said bridge circuit; said pulverizer operating means being actuated by said control means so as to maintain the level of the material in said enclosure within a predetermined range in response to the actuation of said control means by variations in the oscillations in said control circuit; said control means including means for compensating for variations in the leakage resistance of the material.

19. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of a bridge circuit that is resonant at a radio frequency, and that the capacitive impedance of the control condenser is of the order of the capacitive impedance of said connector elements; oscillator means outside said enclosure for impressing on said bridge circuit predetermined electric oscillations of a frequency in the range between about 10 and 300 kilocycles per second at which changes in the reactive impedance of the control condenser caused by variations in the level of the material of the order of a quarter of an inch produce between a control terminal of an external circuit portion of said bridge circuit and another control terminal of said bridge circuit correspondingly varying control voltages of the order of about one-half a millivolt or more; said pulverizer operating means being actuated by said control means so as to maintain the level of the material in said enclosure within a predetermined range in response to the actuation of said control means by variations in the oscillations in said control circuit; said control means including means for compensating for variations in the dielectric constant of the material.

20. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of a bridge circuit that is resonant at a radio frequency, and that the capacitive impedance of the control condenser is of the order of the capacitive impedance of said connector elements; oscillator means outside said enclosure for impressing on said bridge circuit predetermined electric oscillations of a frequency in the range between about 10 and 300 kilocycles per second at which changes in the reactive impedance of the control condenser caused by variations in the level of the material of the order of a quarter of an inch produce between a control terminal of an external portion of said bridge circuit and another control terminal of said bridge circuit correspondingly varying control voltages of the order of about one-half a millivolt or more; the frequency of the impressed oscillations being so chosen that at the frequency of said oscillations the reactive impedance of said control condenser is a multiple of the reactive impedance of the part of the control circuit connected in series therewith and materially modified by changes in the level of the material in the proximity of said condenser, but is only little affected by variations of the leakage resistance of the material in the proximity of said condenser; said pulverizer operating means being actuated by said control means so as to maintain the level of the material in said enclosure within a predetermined range in response to the actuation of said control means by variations in the oscillations in said control circuit; said control means including means for compensating for variations in the dielectric constant of the material.

21. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of one arm of a bridge circuit that is resonant at a radio frequency and has two pairs of diametrically arranged terminal points, and that the capacitive impedance of the control condenser is of the order of the capacitive impedance of said connector elements; oscillator means outside said enclosure for impressing on said bridge circuit predetermined electric oscillations of a frequency in the range between about 10 and 100 kilocycles per second at which changes in the reactive impedance of the control condenser caused by variations in the level of the material of the order of a quarter of an inch produce between a control terminal of an external circuit element and another control terminal of said control circuit correspondingly varying control voltages of the order of about one-half a millivolt or more; said control terminals constituting terminal points of said bridge circuit; said pulverizer operating means being actuated by said control means so as to maintain the level of the material in said enclosure within a predetermined range in response to the actuation of said control means by variations in the oscillations in said control circuit; said control means including means for compensating for variations in the dielectric constant of the material.

22. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of a bridge circuit that is resonant at a radio frequency, and that the capacitive impedance of the control condenser is of the order of the capacitive impedance of said connector elements; oscillator means outside said enclosure for impressing on said bridge circuit predetermined electric oscillations of a frequency in the range between about 10 and 300 kilocycles per second at which changes in the reactive impedance of the control condenser caused by variations in the level of the material of the order of a quarter of an inch produce between a control terminal of an external circuit portion of said bridge circuit and another control terminal of said bridge circuit correspondingly varying control voltages of the order of about one-half a millivolt or more; said pulverizer operating means being actuated by said control means so as to maintain the level of the material in said enclosure within a predetermined range in response to the actuation of said control means by variations in the oscillations in said control circuit; said control means including means for compensating for variations in the dielectric constant and the leakage resistance of the material.

23. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of a bridge circuit that is resonant at a radio frequency, and that the capacitive impedance of the control condenser is of the order of the capacitive impedance of said connector elements; oscillator means outside said enclosure for impressing on said bridge circuit predetermined electric oscillations of a frequency in the range between about 10 and 300 kilocycles per second at which changes in the reactive impedance of the control condenser caused by variations in the level of the material of the order of a quarter of an inch produce between a control terminal of an external circuit portion of said bridge circuit and another control terminal of said bridge circuit correspondingly varying control voltages of the order of about one-half a millivolt or more; the frequency of the impressed oscillations being so chosen that at the frequency of said oscillations the reactive impedance of said control condenser is a multiple of the reactive impedance of the part of the control circuit connected in series therewith and materially modified by changes in the level of the material in the proximity of said condenser, but is only little affected by variations of the leakage resistance of the material in the proximity of said condenser; said pulverizer operating means being actuated by said control means so as to maintain the level of the material in said enclosure within a predetermined range in response to the actuation of said control means by variations in the oscillations in said control circuit; said control means including means for compensating for variations in the dielectric constant and the leakage resistance of the material.

24. In a level control system for an impact pulverizer having a revolving enclosure containing pulverizing means and material subjected to pulverization by the revolving action imparted to the pulverizing means; operating means for said pulverizer; control means including a control condenser having relatively small effective condenser areas operatively exposed to the interior of said enclosure, and serially connected external circuit elements located outside of said enclosure having connector elements serially connected to said control condenser so as to form therewith a level control circuit the reactive impedance of which is modified by variations in the level of the material in said enclosure; said control condenser and said connector elements being so arranged and of such dimensions that when they are interconnected in series with said external circuit elements they form a part of one arm of a bridge circuit that is resonant at a radio frequency and has two pairs of diametrically arranged terminal points, and that the capacitive impedance of the control condenser is of the order of the capacitive impedance of said connector elements; oscillator means outside said enclosure for impressing on said bridge circuit predetermined electric oscillations of a frequency in the range between about 10 and 100 kilocycles per second at which changes in the reactive impedance of the control condenser caused by variations in the level of the material of the order of a quarter of an inch produce between a control terminal of an external circuit element and another control terminal of said control circuit correspondingly varying control voltages of the order of about one-half a millivolt or more; said control terminals constituting terminal points of said bridge circuit; said pulverizer operating means being actuated by said control means so as to maintain the level of the material in said enclosure within a predetermined range in response to the actuation of said control means by variations in the oscillations in said control circuit; said control means including means for compensating for variations in the dielectric constant and the leakage resistance of the material.

JEAN L. LABOULAIS.